(12) United States Patent
Steudle

(10) Patent No.: US 8,861,348 B2
(45) Date of Patent: Oct. 14, 2014

(54) RANDOM ACCESS IMPROVEMENT

(75) Inventor: Otto Ville Steudle, Turku (FI)

(73) Assignee: Nokia Corporation, Espoo (FI)

( * ) Notice: Subject to any disclaimer, the term of this patent is extended or adjusted under 35 U.S.C. 154(b) by 261 days.

(21) Appl. No.: 13/460,980

(22) Filed: May 1, 2012

(65) Prior Publication Data

US 2012/0294145 A1    Nov. 22, 2012

Related U.S. Application Data

(60) Provisional application No. 61/482,451, filed on May 4, 2011.

(51) Int. Cl.
| H04W 28/02 | (2009.01) |
| H04L 12/56 | (2006.01) |
| H04W 74/08 | (2009.01) |

(52) U.S. Cl.
CPC ........... H04L 47/14 (2013.01); H04W 74/0875 (2013.01); H04L 47/2441 (2013.01); H04L 47/2408 (2013.01)
USPC ........... 370/230; 370/329; 370/328; 370/336; 709/224; 709/225; 709/226

(58) Field of Classification Search
CPC ..... H04W 28/02; H04W 74/08; H04W 48/06; H04W 74/04; H04L 12/56; H04L 12/26
USPC .......... 370/230, 229, 329, 328, 336; 455/453, 455/452, 450, 404.1; 709/224, 225, 226, 709/213, 223, 203
See application file for complete search history.

(56) References Cited

U.S. PATENT DOCUMENTS

| 6,674,765 | B1 | 1/2004 | Chuah et al. ................... 370/458 |
| 7,043,751 | B1 | 5/2006 | Fischer et al. ..................... 726/7 |
| 2002/0173316 | A1 | 11/2002 | Jang et al. ...................... 455/453 |
| 2004/0032877 | A1 | 2/2004 | Chuah et al. ................... 370/444 |
| 2010/0226248 | A1* | 9/2010 | Grilli ............................. 370/230 |
| 2010/0248731 | A1 | 9/2010 | Hsieh et al. .................... 455/450 |

FOREIGN PATENT DOCUMENTS

EP     1 052 866  A2    11/2000

OTHER PUBLICATIONS

"3rd Generation Partnership Project; Technical Specification Group Radio Access Network; Medium Access Control (MAC) protocol specification (Release 6)", 3GPP TS 25.321 V6.18.0, Mar. 2009, 20 pgs.
Su, et al., "Mobile Initiated Priority Access Solutions for Cellular Networks", Proceedings/2004 IEEE 59th Vehicular Technology Conference, VTC 2004-Spring: towards a global wireless world; May 17-19, 2004, Milan, Italy, (pp. 1589-1593).

* cited by examiner

*Primary Examiner* — Jamal Javaid
(74) *Attorney, Agent, or Firm* — Harrington & Smith

(57) ABSTRACT

In accordance with the exemplary embodiments of the invention there is at least a method and an apparatus to perform operations in accordance with the exemplary embodiments of the invention including identifying an access class of a plurality of access classes to access a wireless network, the identified access class having an access service class of 0; determining a persistence value of the identified access class, wherein the persistence value is determined based on a persistence formula; and using the determined persistence value of the identified access class to enable the access to the wireless network, wherein the determined persistence value of the identified access class is a value other than 1.

23 Claims, 5 Drawing Sheets

| ASC #i | 0 | 1 | 2 | 3 | 4 | 5 | 6 | 7 |
|---|---|---|---|---|---|---|---|---|
| $P_i$ | 1 | $P(N)$ | $s_2 P(N)$ | $s_3 P(N)$ | $s_4 P(N)$ | $s_5 P(N)$ | $s_6 P(N)$ | $s_7 P(N)$ |

FIG.1

| ASC #i | 0 | 1 | 2 | 3 | 4 | 5 | 6 | 7 |
|---|---|---|---|---|---|---|---|---|
| $P_i$ | $P(N)$ | $c_i P(N)$ | $c_i s_2 P(N)$ | $c_i s_3 P(N)$ | $c_i s_4 P(N)$ | $c_i s_5 P(N)$ | $c_i s_6 P(N)$ | $c_i s_7 P(N)$ |

FIG.2

| | P FOR ASC #0 | P FOR ASC #1...7 |
|---|---|---|
| LEGACY UE | 1 (STATIC VALUE) | P(N), OPTIONAL SIGNALED SCALING FOR ASC #2...7 |
| MODIFIED UE | P(N) | $c_i P(N)$ WITH $c_i$ BEING DIFFERENT FOR EACH ASC, OPTIONAL ADDITIONAL SIGNALLED SCALING FOR ASC #2...7 |

RANDOM ACCESS IMPROVEMENT

RELATED APPLICATIONS

This application claims the benefit of U.S. Provisional Application No. 61/482,451, filed May 4, 2011, which is hereby incorporated by reference in its entirety.

TECHNICAL FIELD

This invention relates generally to radio frequency communications and, more specifically, relates to random access load control for mobile devices trying to access a wireless network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Users may attempt to access a telecommunications network, such as a cellular network, by using a cellular telephone or other user equipment to place a call or start another type of connection, e.g. a data connection, in the following summarized using the term "call". One of the first steps in handling the call is to determine whether the call is being placed to emergency services, or is otherwise to be assigned a special "access services code" or "access service class" (interchangeable terms that are both abbreviated "ASC"). This code can be used to give a call for emergency services immediate access.

However, if a large-scale disaster or similar emergency occurs, very large numbers of people may attempt to place calls to emergency services or similarly access other services mapped to a special class. Since all such calls are given immediate access, network congestion can result, and few or none of the calls may gain access to the cellular network.

SUMMARY

In an exemplary aspect of the invention, there is method, comprising: identifying, with a mobile device, an access class of a plurality of access classes to access a wireless network, the identified access class having an access service class of 0; determining a persistence value of the identified access class, wherein the persistence value is determined based on a persistence formula; and using the determined persistence value of the identified access class to enable the access to the wireless network, wherein the determined persistence value of the identified access class is a value other than 1.

In an exemplary aspect of the invention, there is a non-transitory computer readable storage medium storing computer program code, the computer program code executable by at least one processor to perform at least the method as indicated in the paragraph above.

In another exemplary aspect of the invention, there is, there is an apparatus comprising: at least one processor; and at least one memory including computer program code, where the at least one memory and the computer program code are configured, with the at least one processor, to cause the apparatus to at least: identify an access class of a plurality of access classes to access a wireless network, the identified access class having an access service class of 0; determine a persistence value of the identified access class, wherein the persistence value is determined based on a persistence formula; and use the determined persistence value of the identified access class to enable the access to the wireless network, wherein the determined persistence value of the identified access class is a value other than 1.

In an exemplary yet another aspect of the invention, there is means for identifying, an access class of a plurality of access classes to access a wireless network, the identified access class having an access service class of 0; means for determining a persistence value of the identified access class, wherein the persistence value is determined based on a persistence formula; and means for using the determined persistence value of the identified access class to enable the access to the wireless network, wherein the determined persistence value of the identified access class is a value other than 1.

In accordance with the exemplary embodiments of the invention as described in the paragraph above, the means for identifying, determining, and using comprises and interface to the wireless network, and at least one memory storing computer program code, the computer program code executed by at least one processor.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 1 is a table from 3GPP TS 25.331 that shows the persistence values to be used for RACH accesses in section 8.5.12;

FIG. 2 is a table that shows the persistence values to be used for RACH accesses in accordance with an exemplary embodiment;

DETAILED DESCRIPTION

Figure 3:
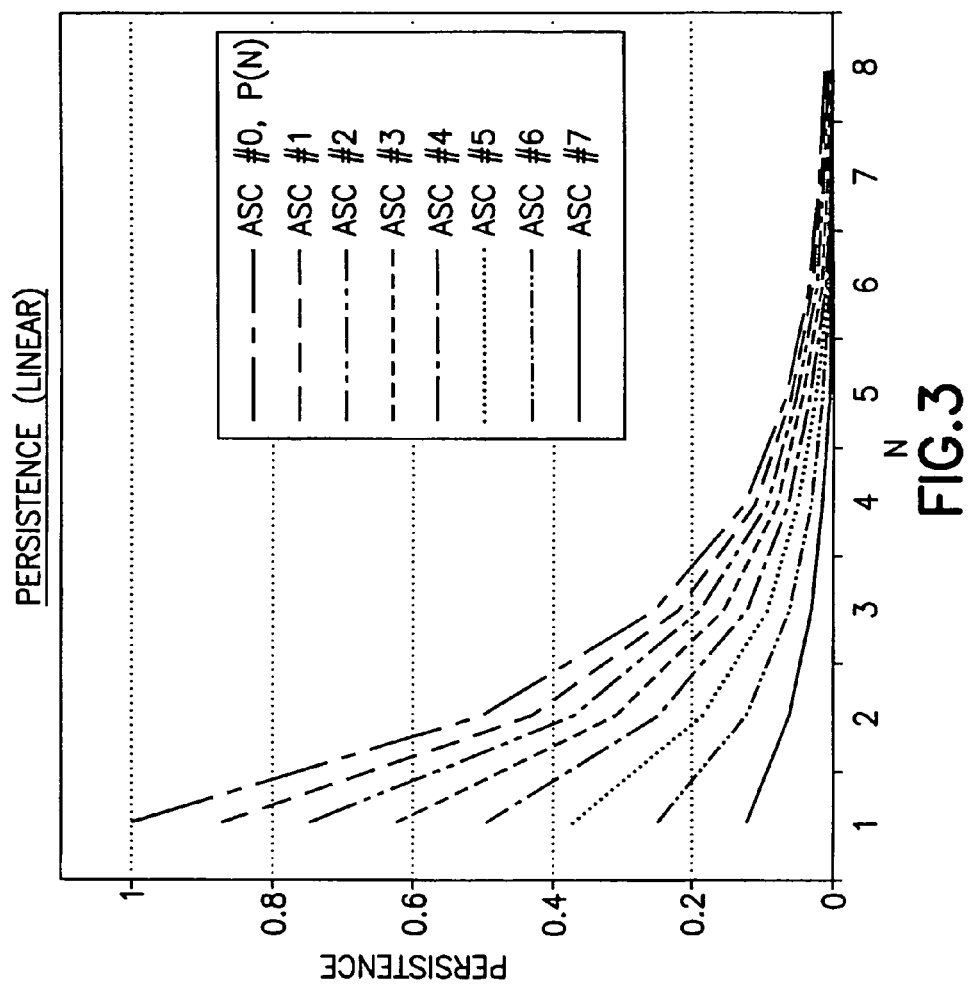
FIG. 3 is a chart of exemplary persistence values for different ASC and different N values (linear scale)

The WCDMA (wideband code division multiple access) RACH (random access channel) allows for random access load control using different access service classes (ASC). As a configuration parameter for ASC #0 is missing (i.e., is fixed to one), there is a problem of congestion in high load scenarios. The exemplary embodiments herein provide solutions to avoid the congestion.

As stated above, One of the first steps in handling the call is to determine whether the call is being placed to emergency services, or is otherwise to be assigned a special "access services code" or "access service class" (interchangeable terms that are both abbreviated "ASC"). For example, a 3GPP (third generation partnership project) specification allows a cellular operator to allow user equipment to determine an ASC of any integer value from zero to seven. Emergency services typically use ASC=0.

If ASC=0, then the user equipment (UE) immediately attempts to pass the call through to the communications network. If ASC=1 or some other value, however, then the user equipment calculates a "persistence" value based on previous base station transmissions, and delays access based on the relation between a random number and the persistence threshold. One possibility is to iterate through a loop. At iteration the user equipment generates a random number and only allows the access attempt if the random number is less than the persistence value. The persistence value may be regarded as a probability that the user equipment will connect to the network during iterations.

By providing immediate access to all access attempts for which ASC=0, the cellular network according to prior art can give priority to some user groups or call types, such as emergency calls to 911 in the United States. Emergency calls may be said to have a 100 percent persistence value, in that the user equipment will certainly initiate the access attempt immediately. When only a few users are placing calls to emergency services, this technique can work well. Without limitation, "emergency call" is used in the following as an example for prioritized access.

However, without any randomization, there is the potential for a high level of collisions among mobile stations trying to place emergency calls all at the same time. Since all such emergency service calls may be given immediate access, network congestion can result, and few or none of the calls will gain access to the cellular network. Further, if all of the users retry their calls after failing to receive an acknowledgement, another collision will result, and few of the users will gain access to the telecommunications network. Also, the number of new users attempting new calls on the loaded network cannot be controlled, as there is no method to instruct them to distribute their initial access in time by delaying it. For the scenario of a growing number of calls, overload inevitably results. The exemplary embodiments of the invention provide solutions to avoid such overloading and congestion.

The specification 3GPP TS 25.331 (Radio Resource Control (RRC); Protocol specification) defines the persistence values to be used for random access channel (RACH) accesses in section 8.5.12 as shown in FIG. 1. As can be seen from the table, the persistence value for ASC #0 is fixed to 1. The ASC #0 is used for accesses with highest priority, e.g. emergency calls. According to 3GPP standards, the physical random access channel (PRACH) resources (i.e. access slots and preamble signatures for frequency division duplex (FDD)), timeslot (with specific frame allocation and channelisation code for 3.84 Mcps time division duplex (TDD) and 7.68 Mcps TDD, and SYNC UL codes (with specific frame allocation) for 1.28 Mcps TDD) may be divided between different Access Service Classes in order to provide different priorities of RACH usage. It is possible for more than one ASC or for all ASCs to be assigned to the same access slot/signature space in FDD or frame allocation/channelization codes in 3.84 Mcps TDD or 7.68 Mcps TDD, or frame allocation/SYNC_UL codes in 1.28 Mcps TDD. As shown in FIG. 1, per 3GPP standards access service classes shall be numbered in the range $0 \leq i \leq \text{NumASC} \leq 7$ (i.e. the maximum number of ASCs is 8). Per 3GPP, an ASC is defined by an identifier, i, that defines a certain partition of the physical radio access channel (PRACH) resources and an associated persistence value $P_i$. PRACH partitions shall be established using the information element "PRACH partitioning". Further, the persistence values $P_i$ to be associated with each ASC shall be derived from the dynamic persistence level N=1, . . . , 8 which is broadcast in System Information Block 7, and the persistence scaling factors $s_i$, broadcast in System Information Block Type 5 or System Information Block type 5bis and possibly also in System Information Block Type 6 as $P(N)=2^{-(N-1)}$.

However, in the standards there is not identified a way to adjust the persistence value for the class ASC #0, which leads to problems in a scenario with a high number of simultaneous access attempts, e.g., emergency calls after a large-scale accident or natural disaster. Dynamic persistence adjustment is not possible for that class and the individual access attempts cannot be distributed in time, leading to RACH congestion.

More particularly, the wideband code division multiple access (WCDMA) and RACH allows for random access load control using different ASC using a mechanism called "persistence" as partly described above. With the current specification, there are two problems:

A configuration parameter for ASC #0 is missing. For that access class, there is no method to reduce the number of accesses by a UE, which causes a problem of congestion in high load scenarios.

When no optional scaling factors (si) are signaled, the persistence values are identical for most of the classes. Therefore, making the access class persistence values different causes some signaling load, which could be avoided.

Because of these problems, techniques (in an exemplary embodiment) to make the persistence value configurable for ASC #0 is desirable.

Exemplary embodiments of the invention provide one or more of the following components:

The P (persistence) value for ASC #0 is made flexible, i.e., network configurable, by using the existing P(N) also for ASC #0.

The P (persistence) value for each ASC is scaled according to a predetermined scaling formula, resulting in persistence values that reflect the shrinking of priority of ASC with a higher index.

In order to solve the problem of lack of control of the persistence value for ASC #0, its definition has to be modified to be flexible. It is proposed herein (as described above) to make ASC #0 configurable. For a definition of P(N), see 3GPP TS 25.331 section 8.5.12.

The persistence value of ASC #0 is made dependent on the existing formula P(N). Thus, the broadcasted parameter N allows also for adjustment of that class.

In addition, the definition of persistence factors for each ASC is changed to include an ASC-specific static scaling factor. This change allows for a differentiation between ASC even without using the optional signaled scaling factors $s_i$. The static scaling factor $c_i$ for each ASC number i is calculated in an exemplary embodiment as follows (see FIG. 2; note that $c_i$ could also be included for index 1 in FIG. 2 because $c_i=1$ in the formula below):

$$c_i=1-0.125i, \text{ with } i \text{ being the ASC index.}$$

The static scaling factor $c_i$ may be determined using monotonically decreasing functions other than the 1-0.125i function shown above. That is, instead of the formula for $c_i$, also other formulas would be possible, e.g.:

$$c_i=1-0.1i;$$

$$c_i=2^{-i}; \text{ or}$$

$$c_i=2^{-0.5i}$$

Some of the formulas have the advantage of easier implementation on hardware without floating point units like DSP (digital signal processor, e.g., as DP 10A in FIG. 6, described below), e.g., by using values related to powers of two or fractions of two (four, eight, etc.). The scaling factor is considered to be static because the UE would be able to determine the scaling factor without network access (or with only minimal network access, e.g., to download the monotonically decreasing function or its coefficients).

Figure 4:
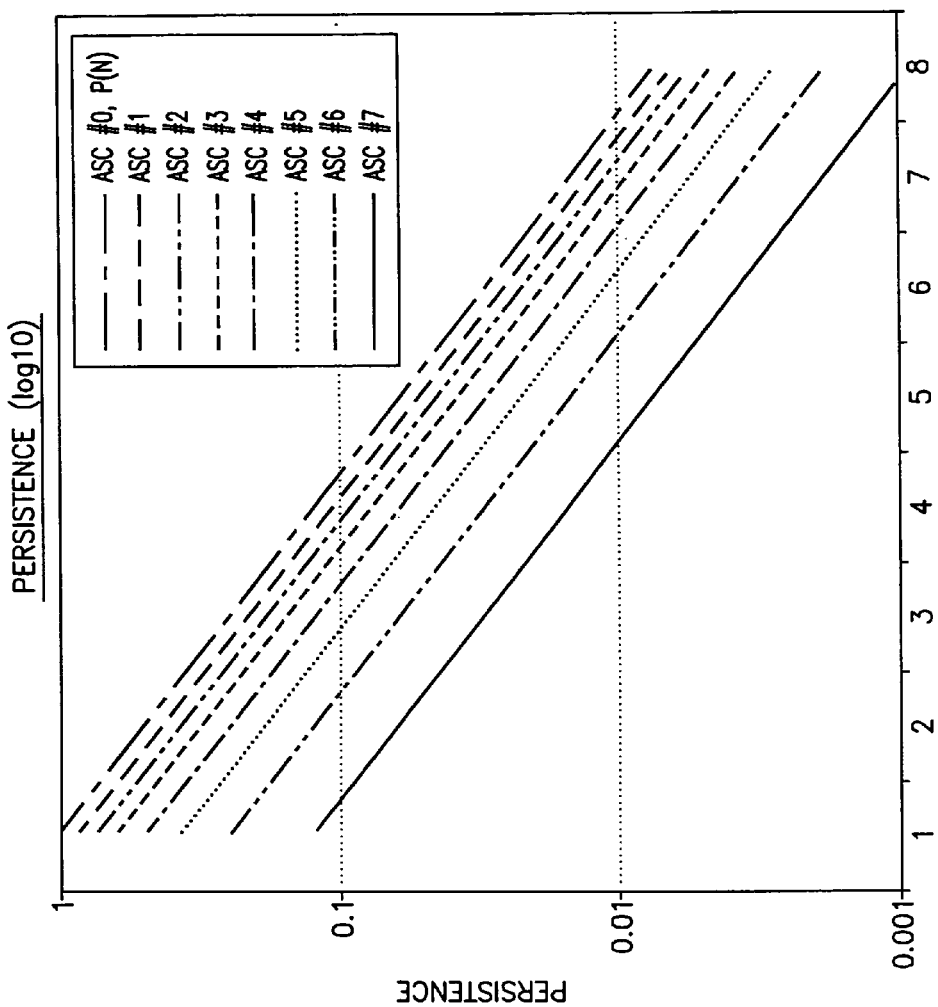
FIG. 4 is a chart of exemplary persistence values for different ASC and different N values ($\log_{10}$ scale)

The resulting persistence value curve for a sample static scaling factor formula is shown in FIGS. 3 and 4. The persistence values naturally follow the priority order of the ASC, while changing the broadcasted N value shifts the overall operation point. Additional adjustment or scaling might be done by using the optional scaling factors $s_i$ (not visualized in FIGS. 3 and 4). It is noted that the curves shown in FIGS. 3 and 4 have the curve for ASC #0>the curve for ASC #1> . . . > the curve for ASC #6>the curve for ASC #7.

Figures 5, 6:
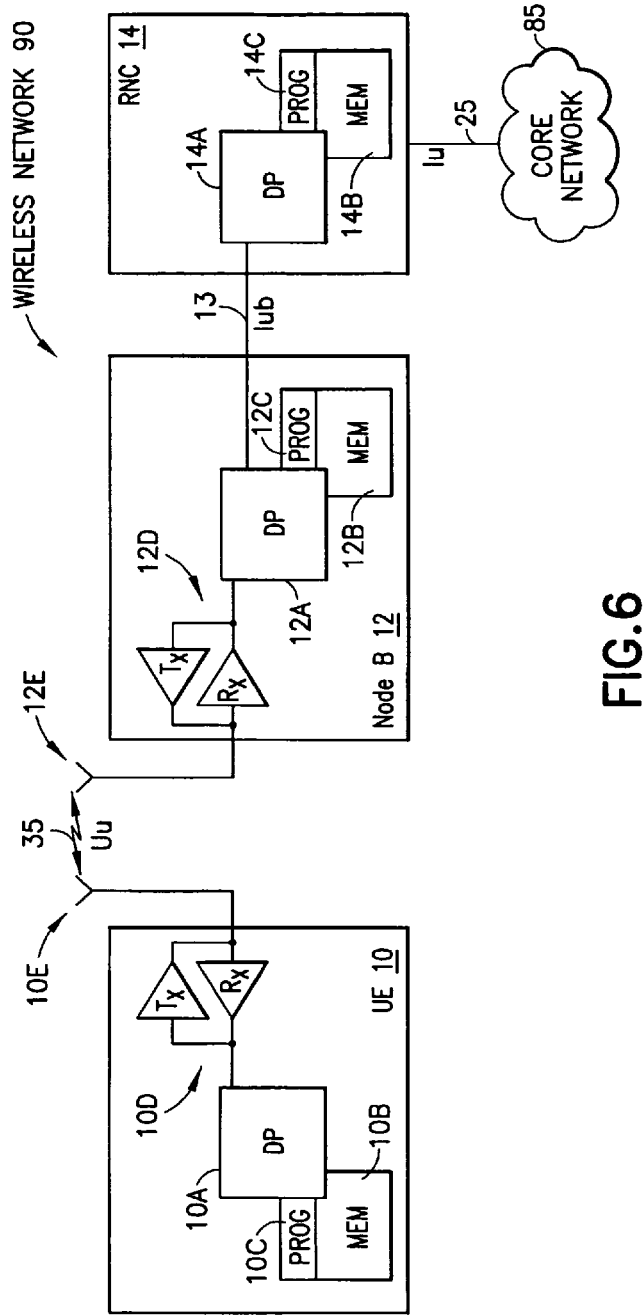
FIG. 5 is an example of access-service-class-specific static scaling for legacy and modified UEs.
FIG. 6 shows a simplified block diagram of various electronic devices that are suitable for use in practicing the exemplary embodiments of this invention.

In the table shown in FIG. 5, the differences between prior art UE and UE according to one embodiment are summarized.

In an operational network, when using access services classes, a legacy UE might cause higher load to RACH due to not using the updated persistence definitions, but no general incompatibility exists. This disadvantage is more than compensated with the advantage of being able to avoid critical congestion.

Non-limiting advantages of the instant invention include, but are not limited to, one or more of the following:
Different Pi values for different ASC #i without the need for extra signaling (of the $s_i$ scaling factors); and
Possibility to adjust the persistence value for ASC #0, e.g. based on network load.

Reference is now made to FIG. 6 for illustrating a simplified block diagram of various electronic devices and apparatus that are suitable for use in practicing the exemplary embodiments of this invention. In FIG. 6, a wireless network 90 is adapted for communication over a wireless link 35 (via a Uu interface) with an apparatus, such as a mobile communication device which may be referred to as a UE 10, via a network access node, such as a Node B (base station). The network 90 may include a radio network controller (RNC) 14 that provides connectivity with a further core network 85, via a link 25 (via an Iu interface).

The UE 10 includes a controller, such as at least one data processor (DP) 10A, at least one non-transitory computer-readable memory medium embodied as a memory (MEM) 10B that stores a program of computer instructions (PROG) 10C, and at least one suitable radio frequency (RF) transmitter and receiver pair (transceiver) 10D for bidirectional wireless communications with the Node B 12 via one or more antennas 10E. The Node B 12 also includes a controller, such as at least data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas 12E (typically several when multiple input/multiple output (MIMO) operation is in use). The Node B 12 is coupled via a data/control path 13 to the RNC 14. The path 13 may be implemented as an Tub interface. The RNC 14 also includes a controller, such as at least one data processor (DP) 14A, and at least one computer-readable memory medium embodied as a memory (MEM) 14B that stores a program of computer instructions (PROG) 14C.

At least programs 10C and 12C are assumed to include program instructions that, when executed by the associated DP 10A, 12A, enable the corresponding UE 10, Node B 12 to operate in accordance with the exemplary embodiments of this invention, as will be discussed below in greater detail. The exemplary embodiments of this invention may be implemented at least in part by computer software executable by at least one of the data processors, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable memories 10B and 12B may be of any type suitable to the local technical environment and may be implemented using any suitable data storage technology, such as semiconductor based memory devices, random access memory, read only memory, programmable read only memory, flash memory, magnetic memory devices and systems, optical memory devices and systems, fixed memory and removable memory. The data processors 10A and 12A may be of any type suitable to the local technical environment, and may include one or more of general purpose computers, special purpose computers, microprocessors, digital signal processors (DSPs) and processors based on multi-core processor architectures, as non-limiting examples.

Figure 7:
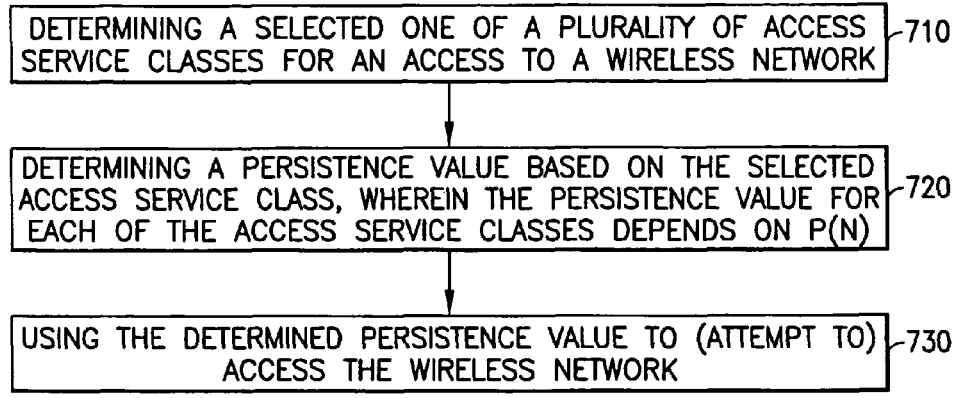
FIGS. 7 and 8 are each logic flow diagrams that illustrates the operation of a method, and a result of execution of computer program instructions embodied on a computer readable memory, in accordance with the exemplary embodiments of this invention.

FIG. 7 is a logic flow diagram that illustrates the operation of a method, and a result of execution of computer program instructions embodied on a computer readable memory, in accordance with the exemplary embodiments of this invention. It is noted that the operations in FIG. 7 may be performed with user equipment such as the UE 10. In addition, the operations in FIG. 7 may also be seen as means for performing the indicated operations. In block 710, the operation is performed of determining a selected one of a plurality of access service classes for an access to a wireless network. In block 720, the operation is performed of determining a persistence value based on the selected access service class, wherein the persistence value for each of the access service classes depends on P(N). In block 730, the operation is performed of using the determined persistence value to (attempt to) access the wireless network. It is noted that a UE may access the network or may simply attempt to access the network and try again based on the particular persistence value being used.

Although the exemplary embodiments are described above in terms of the WCDMA RACH channel, the exemplary embodiments may also be applicable to other scenarios.

A method is disclosed that includes determining a selected one of a plurality of access service classes for an access to a wireless network; determining a persistence value based on the selected access service class, wherein the persistence value for each of the access service classes depends on P(N); and using the determined persistence value to access the wireless network.

The method of the previous paragraph wherein a persistence value for an access service class having an index of zero is P(N).

The method of the previous paragraph wherein determining a persistence value comprises determining the persistence value for each of the access service classes using a monotonically decreasing function multiplied by P(N).

The method of the preceding paragraph wherein the monotonically decreasing function is $c_i=1-0.125i$, with i being an index of an individual one of the plurality of access service classes.

The method according to the paragraphs above wherein the monotonically decreasing function is $c_i=1-0.1i$, with i being an index of an individual one of the plurality of access service classes.

The method according to the paragraphs above wherein the monotonically decreasing function is $c_i=2^{-i}$, with i being an index of an individual one of the plurality of access service classes.

The method according to the paragraphs above wherein the monotonically decreasing function is $c_i=2^{-0.5i}$, with i being an index of an individual one of the plurality of access service classes.

The method of the preceding paragraphs wherein determining the persistence value further comprises multiplying each of the persistence values for access service classes having indices of two or larger with a predetermined one of a plurality of scaling factors.

The method of the preceding paragraph wherein the plurality of scaling factors are signaled from a network (e.g., base station) to a UE performing the method.

The method of any of the previous paragraphs wherein the N is signaled from a network (e.g., base station) to a UE performing the method.

The method of any of the previous paragraphs wherein the access is to a wideband code division multiple access random access channel.

A computer program product comprising a computer-readable medium bearing computer program code embodied therein for use with a computer, the computer program code comprising code for performing the method of any of the preceding paragraphs.

An apparatus comprising means for determining a selected one of a plurality of access service classes for an access to a wireless network; means for determining a persistence value based on the selected access service class, wherein the persistence value for each of the access service classes depends on P(N); and means for using the determined persistence value to access the wireless network.

An apparatus comprising at least one memory and at least one computer program code configured, with at least one data processor, to perform the method of any of the preceding paragraphs. The apparatus of the preceding sentence, comprising a UE.

Figure 8:
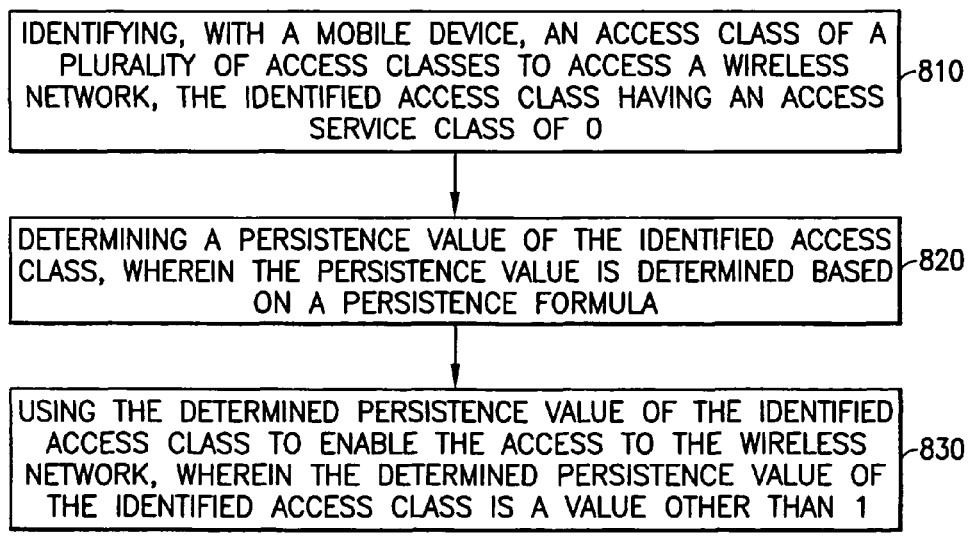

FIG. 8 is a logic flow diagram that illustrates the operation of a method, and a result of execution of computer program instructions embodied on a computer readable memory, in accordance with the exemplary embodiments of this invention. It is noted that the operations in FIG. 8 may be performed with user equipment such as the UE 10. In addition, the operations in FIG. 8 may also be seen as means for performing the indicated operations. In block 810, the operation is performed of identifying, with a mobile device, an access class of a plurality of access classes to access a wireless network, the identified access class having an access service class of 0. As shown in block 820 there is an operation of determining a persistence value of the identified access class, wherein the persistence value is determined based on a persistence formula. Further, as shown in block 830, an operation is performed of using the determined persistence value of the identified access class to enable the access to the wireless network, wherein the determined persistence value of the identified access class is a value other than 1. It is noted that a UE may access the network or may simply attempt to access the network and try again based on the particular persistence value being used.

The method of the previous paragraphs wherein the persistence value is determined using a scaling factor of at least one scaling factor tabulated in a message received from the wireless network.

The method of the previous paragraphs, wherein the selected access class is a highest access class #0.

The method of the previous paragraph, wherein the persistence formula is using a persistence scaling factor.

The method of the previous paragraph wherein the persistence scaling factor is using a monotonically decreasing function that decreases from the selected priority access class to lower priority access class multiplied by the value from the persistence formula.

The method of the preceding paragraph above wherein the monotonically decreasing function is $c_i=1-0.125i$, with i being an index of an individual one of the plurality of access classes.

The method according to the paragraph above wherein the monotonically decreasing function is $c_i=1-0.1i$, with i being an index of an individual one of the plurality of access classes.

The method according to the paragraph above wherein the monotonically decreasing function is $c_i=2^{-i}$, with i being an index of an individual one of the plurality of access classes.

The method according to the paragraph above wherein the monotonically decreasing function is $c_i=2^{-0.5i}$, with i being an index of an individual one of the plurality of access classes.

The method of the preceding paragraph above where a scaling function used to scale the value from the persistence formula is based at least in part on a level of usage of at least one access channel of the wireless access network, wherein higher levels of usage correspond to higher values produced by the scaling function and lower levels of usage correspond to lower values produced by the scaling function.

The method of the preceding paragraph where the scaling factors are one of signaled from the wireless network to the network node or are programmed into the network node.

The method of any of the previous paragraphs where the network node comprises a user equipment of the wireless network.

The method of any of the previous paragraphs where the access uses a wideband code division multiple access random access channel.

The method according to the paragraphs above where determining a persistence value further comprises determining the persistence value by multiplying the scaled value by a value of a scaling factor determined for the selected access class based on a corresponding index of the selected access class from indices corresponding to the plurality of access classes, and wherein the scaling factor for the selected access service class is not defined.

A computer program product comprising a computer-readable medium bearing computer program code embodied therein for use with a computer, the computer program code comprising code for performing the method of any of the preceding paragraphs.

An apparatus comprising at least one memory and at least one computer program code configured, with at least one data processor, to perform the method of any of the preceding paragraphs. The apparatus of this paragraph and/or the preceding paragraph embodying a UE.

An apparatus comprising means for identifying, an access class of a plurality of access classes to access a wireless network, the identified access class having an access service class of 0; means for determining a persistence value of the identified access class, wherein the persistence value is determined based on a persistence formula; and means for using the determined persistence value of the identified access class to enable the access to the wireless network, wherein the determined persistence value of the identified access class is a value other than 1.

The apparatus as described in the paragraph above, wherein the means for identifying, determining, and using comprises and interface to the wireless network, and at least one memory storing computer program code, the computer program code executed by at least one processor.

Embodiments of the present invention may be implemented in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 6. A computer-readable medium may comprise a computer-readable storage medium (e.g., device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out above.

It is also noted herein that while the above describes example embodiments of the invention, these descriptions should not be viewed in a limiting sense. Rather, there are several variations and modifications which may be made without departing from the scope of the present invention.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method, comprising:
identifying, with a mobile device, an access class of a plurality of access classes to access a wireless network, the identified access class having an access service class of 0;
determining a persistence value of the identified access class, wherein the persistence value is determined based on a persistence formula, wherein the persistence formula is using a persistence scaling factor, wherein the persistence scaling factor is using a scaling function to scale the value from the persistence formula, and wherein the persistence scaling factor is based at least in part on a level of usage of at least one access channel of the wireless network, and wherein higher levels of usage correspond to higher values produced by the scaling function and lower levels of usage correspond to lower values produced by the scaling function; and
using the determined persistence value of the identified access class to enable the access to the wireless network, wherein the determined persistence value of the identified access class is a value other than 1.

2. The method according to claim 1, wherein the persistence value is determined using a scaling factor of at least one scaling factor tabulated in a message received from the wireless network.

3. The method according to claim 1, wherein the persistence scaling factor is using a monotonically decreasing scaling function that decreases from the identified access class to a lowest priority access class multiplied by the value from the persistence formula.

4. The method according to claim 1, wherein the persistence scaling factor is using a monotonically decreasing function of $c_i=1-0.125i$, with i being an index of an individual one of the plurality of access classes.

5. The method according to claim 1, wherein the persistence scaling factor is using a monotonically decreasing function of $c_i=1-0.1i$, with i being an index of an individual one of the plurality of access classes.

6. The method according to claim 1, wherein the persistence scaling factor is using a monotonically decreasing function of $c_i=2^{-i}$, with i being an index of an individual one of the plurality of access classes.

7. The method according to claim 1, wherein the persistence scaling factor is using a monotonically decreasing function of $c_i=2^{-0.5i}$, with i being an index of an individual one of the plurality of access classes.

8. The method according to claim 1, wherein the mobile device comprises a user equipment of the wireless network.

9. The method according to claim 1, wherein the access uses a wideband code division multiple access random access channel.

10. The method according to claim 1, wherein the persistence value is determined by multiplying the scaled value by a value of an access service class scaling factor determined for the identified access class based on a corresponding index of the identified access class from indices corresponding to the plurality of access classes.

11. The method according to claim 1, wherein identifying the access class comprises identifying an access class to access service class mapping of a broadcast channel.

12. A non-transitory computer readable storage medium storing computer program code, the computer program code executable by a at least one processor to perform the method according to claim 1.

13. An apparatus comprising:
at least one processor; and
at least one memory including computer program code, where the at least one memory and the computer program code are configured, with the at least one processor, to cause the apparatus to at least:
identify an access class of a plurality of access classes to access a wireless network, the identified access class having an access service class of 0;
determine a persistence value of the identified access class, wherein the persistence value is determined based on a persistence formula, wherein the persistence formula is using a scaling function using a persistence scaling factor, wherein the persistence scaling factor is used to scale the value from the persistence formula, and wherein the persistence scaling factor is based at least in part on a level of usage of at least one access channel of the wireless network, and wherein higher levels of usage correspond to higher values produced by the scaling function and lower levels of usage correspond to lower values produced by the scaling function; and
use the determined persistence value of the identified access class to enable the access to the wireless network, wherein the determined persistence value of the identified access class is a value other than 1.

14. The apparatus according to claim 13, wherein the persistence value is determined using a scaling factor of at least one scaling factor tabulated in a message received from the wireless network.

15. The apparatus according to claim 13, wherein the persistence scaling factor is using a monotonically decreasing scaling function that decreases from the identified access class to a lowest priority access class multiplied by the value from the persistence formula.

16. The apparatus according to claim 13, wherein the persistence scaling factor is using a monotonically decreasing function of $c_i=1-0.125i$, with i being an index of an individual one of the plurality of access classes.

17. The apparatus according to claim 13, wherein the persistence scaling factor is using a monotonically decreasing function of $c_i=1-0.1i$, with i being an index of an individual one of the plurality of access classes.

18. The apparatus according to claim 13, wherein the persistence scaling factor is using a monotonically decreasing function of $c_i=2^{-i}$, with i being an index of an individual one of the plurality of access classes.

19. The apparatus according to claim 13, wherein the persistence scaling factor is determined using a monotonically decreasing function of $c_i=2^{-0.5i}$, with i being an index of an individual one of the plurality of access classes.

20. The apparatus according to claim 13, wherein the apparatus comprises a user equipment of the wireless network.

21. The apparatus according to claim 13, wherein the access uses a wideband code division multiple access random access channel.

22. The apparatus according to claim 13, wherein the persistence value is determined by multiplying the scaled value by a value of an access service class scaling factor determined for the identified access class based on a corresponding index of the identified access class from indices corresponding to the plurality of access classes.

23. The apparatus according to claim 13, wherein identifying the access class uses an access service class mapping of a broadcast channel.

* * * * *